(12) United States Patent
Kowall et al.

(10) Patent No.: US 12,153,884 B1
(45) Date of Patent: Nov. 26, 2024

(54) ADVANCED TRANSFORMER ARCHITECTURE WITH EPISTEMIC EMBEDDING FOR ENHANCED NATURAL LANGUAGE PROCESSING

(71) Applicant: NOLA AI, Inc., New Orleans, LA (US)

(72) Inventors: Correy Allen Kowall, New Orleans, LA (US); Robert Donald Veglahn, Boston, MA (US); Nivedita Sivakumar, Richardson, TX (US); Jober't Aladwan, New Orleans, LA (US); Mitchell Klein, New Orleans, LA (US)

(73) Assignee: NOLA AI, Inc., New Orleans, LA (US)

( * ) Notice: Subject to any disclaimer, the term of this patent is extended or adjusted under 35 U.S.C. 154(b) by 0 days.

(21) Appl. No.: 18/799,635

(22) Filed: Aug. 9, 2024

Related U.S. Application Data

(60) Provisional application No. 63/518,556, filed on Aug. 9, 2023.

(51) Int. Cl.
  *G06F 40/30* (2020.01)
  *G06F 40/284* (2020.01)
  *G06N 20/00* (2019.01)

(52) U.S. Cl.
  CPC ............ *G06F 40/284* (2020.01); *G06F 40/30* (2020.01); *G06N 20/00* (2019.01)

(58) Field of Classification Search
  CPC .......... G06F 40/20; G06F 40/30; G06N 20/00
  See application file for complete search history.

(56) References Cited

U.S. PATENT DOCUMENTS

| | | | |
|---|---|---|---|
| 2022/0059228 A1* | 2/2022 | Chen | G06F 16/254 |
| 2022/0114481 A1* | 4/2022 | Yang | G06N 3/088 |
| 2022/0198146 A1* | 6/2022 | Ding | G06N 3/045 |

OTHER PUBLICATIONS

Vaswani, A. "Attention is all you need." Advances in Neural Information Processing Systems (2017). (Year: 2017).*
Raza, Shaina, and Chen Ding. "Fake news detection based on news content and social contexts: a transformer-based approach." International Journal of Data Science and Analytics 13.4 (2022): 335-362. (Year: 2022).*
Salerno, Joe. "How to Embed Epistemic Modals without Violating Modus Tollens." (2013). (Year: 2013).*

* cited by examiner

*Primary Examiner* — Jialong He
(74) *Attorney, Agent, or Firm* — Marin Patents LLC; Gustavo Marin

(57) ABSTRACT

An advanced transformer architecture for an LLM with epistemic embedding for disclosed. The LLM includes a corpus address system for detailed addressing of input data, an input layer configured to create detailed addressing for words and sentences within the input corpus, and an embedding layer that combines epistemic embedding, word embedding, metadata embedding, and speaker tag embedding, and a corpus attention system using attention markers for managing focus. Epistemic embedding for the input corpus is generated using a vignette tableau and the epistemic embeddings are indicative of user sentiment and epistemic evidence values.

5 Claims, 7 Drawing Sheets ial Appli# ADVANCED TRANSFORMER ARCHITECTURE WITH EPISTEMIC EMBEDDING FOR ENHANCED NATURAL LANGUAGE PROCESSING

REFERENCE TO RELATED APPLICATIONS

This application claims priority to U.S. Provisional Application No. 63/518,556, filed Aug. 9, 2023, the specification of which is hereby incorporated by reference in its entirety.

BACKGROUND OF THE INVENTION

Field of the Art

The disclosure relates to the field of language models, and more particularly to the field of improving the speed and veracity of language models by incorporating epistemic embedding.

Discussion of the State of the Art

Large Language Models (LLMs) are advanced artificial intelligence systems designed to understand, generate, and manipulate human language. LLMs are deep learning models trained on vast amounts of text data to predict and generate human-like text. LLMs are capable of text generation, translation, summarization, question answering, code generation, and creative writing. LLMs are increasingly being used in applications including but not limited to chatbots and virtual assistants, content creation, language translation, data analysis, and insights generation.

Although LLMs are revolutionizing how we interact with computers and process information, with the potential to transform various industries and aspects of daily life, they do present challenges in the form of output being biased, fairness issues, and hallucinations (generating false information).

Hallucinations are a significant challenge in LLMs. This term refers to the phenomenon where these models generate information that sounds plausible but is factually incorrect or entirely fabricated. Hallucinations occur because LLMs are trained to predict likely sequences of words based on patterns in their training data, rather than on a deep understanding of truth or reality.

Further, existing LLMs fail to capture subtleties in language related to knowledge, beliefs, certainty, doubt, and perspective. Hence, there is a need for LLMs that have improved veracity of information presented to the user, and LLMs that take into account not just the words themselves, but their broader context, potential interpretations, and degrees of certainty or speculation

SUMMARY OF THE INVENTION

Accordingly, the inventor has conceived and reduced to practice, in a preferred embodiment of the invention, a system for performing NLP task, the system including: a computer, including a processor, a memory, and a plurality of programming instructions, the plurality of programming instructions when executed by the processor cause the processor to: send an input corpus and a prompt with NLP to an LLM, wherein the LLM includes: an input layer configured to create detailed addressing for words and sentences within the input corpus; an embedding layer configured to: generate epistemic embedding for the input corpus using a vignette tableau, wherein vignettes in the vignette tableau determine and manage the epistemic embedding, wherein epistemic embeddings are indicative of user sentiment and epistemic evidence values; combine the epistemic embedding, word embedding, metadata embedding, and speaker tag embedding to generate tokens with multiple vectors; identify carrot positions in the input corpus for tokens with multiple vectors; an output layer configured to: receive tokens processed from a Multi-Headed Attention (MHA) System; and receive tokens directly from the embedding layer; and generate an output by reconstructing the input using tokens from the MHA and the embedding layer, wherein the output is presented on a graphical user interface.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
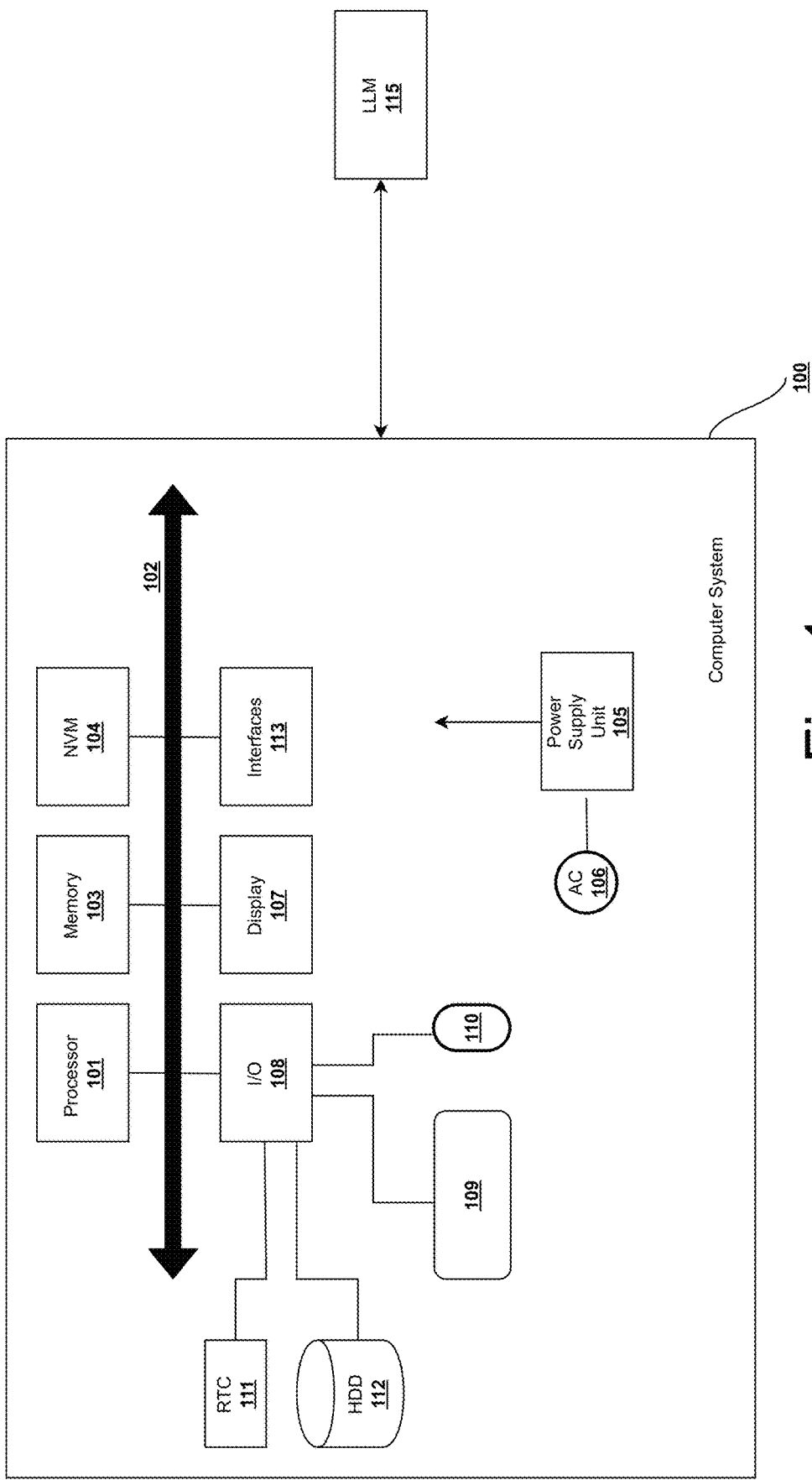
FIG. 1 is a block diagram of an example of an apparatus or device for performing a context-sensitive Natural Language Processing (NLP) task and of a computer system comprising such an apparatus or device, according to an embodiment of the invention.

FIG. 1 is a block diagram of an example of an apparatus 100 or device for performing a context-sensitive NLP task and of a computer system comprising such an apparatus or device, according to an embodiment of the invention. Various modifications and changes may be made to computer system without departing from the broader spirit and scope of the system and method disclosed herein. CPU 101 is connected to bus 102, to which bus is also connected memory 103, nonvolatile memory 104, display 107, I/O unit 108, and network interface card (NIC) 113. I/O unit 108 may, typically, be connected to keyboard 109, pointing device 110, hard disk 112, and real-time clock 111. NIC 113 connects to network, which may be the Internet or a local network, which local network may or may not have connections to the Internet. Also shown as part of system 100 is power supply unit 105 connected, in this example, to AC supply 106. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

CPU 101 is to obtain a prompt from a user for generating output for an NLP task. NLP tasks may include but are not limited to text classification, sentiment analysis, summarization, question answering, named entity recognition, and machine translation. Processor 101 provides the information on the context-sensitive NLP task and the prompt as input for a Large Language Model (LLM) 115. Content-sensitive NLP tasks may include sentiment analysis, personalized dialog generation, or any other application where emotional state of the text is relevant. LLM 115 has an advanced transformer architecture with epistemic embedding.

Figure 2:
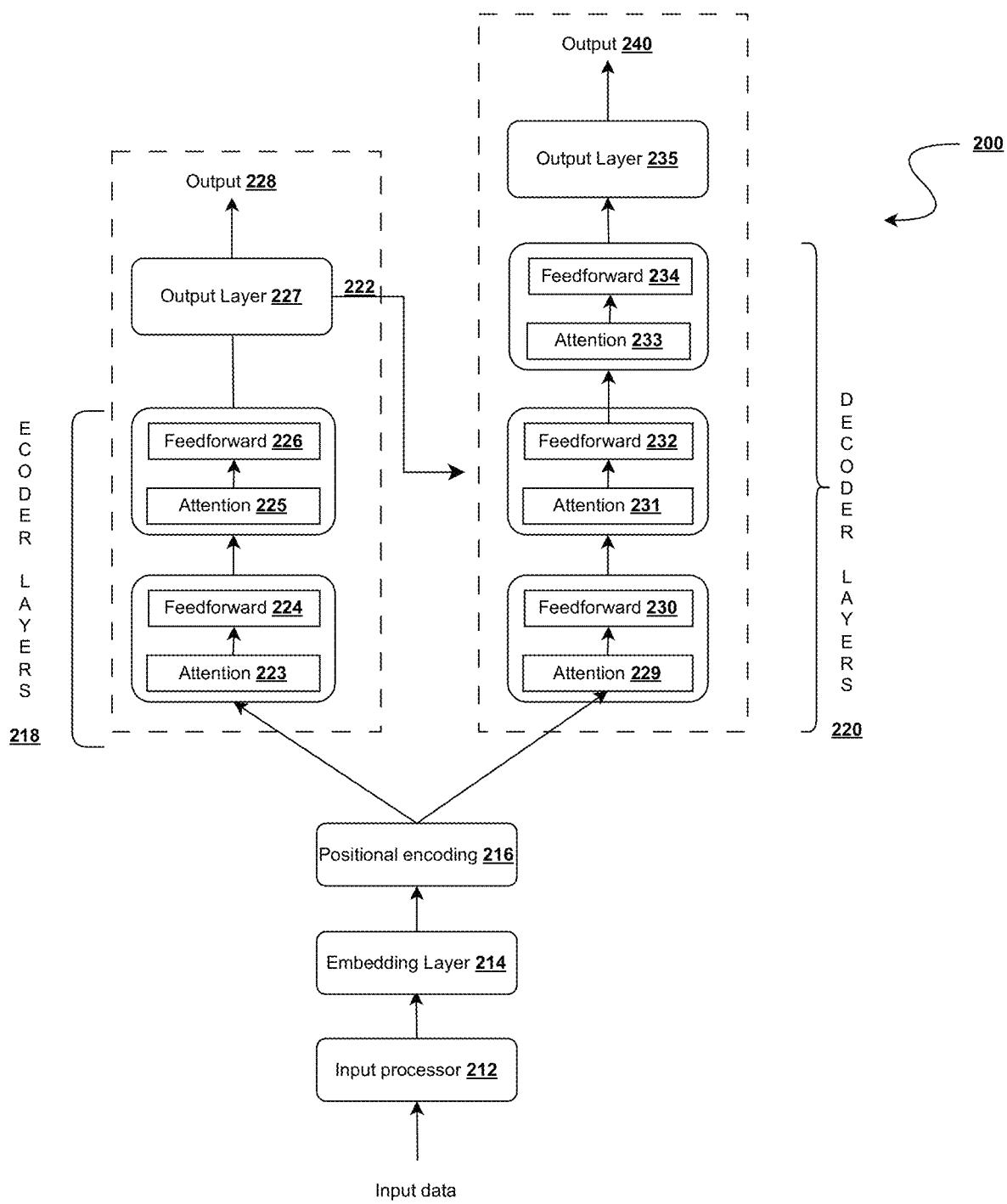
FIG. 2 is an example block diagram of an encoder-decoder neural transformer model, in accordance with an embodiment of the invention.

FIG. 2 is an example block diagram of an encoder-decoder neural transformer model 200, in accordance with an embodiment of the invention. Neural transformers used for performing NLP tasks may be referred to as foundation models or Language models. Transformer architecture depicted in FIG. 2 may be combined with different types of neural networks such as CNN, RNN, LSTM, transformers, etc. to enhance its capabilities and address complex problems.

In an embodiment, LLM 115 may be an encoder transformer model and/or decoder transformer model. The core of the transformer architecture 200 consists of encoder layers 218 and decoder layers 220. Encoder layers 218 processes the input data and transform it into a different representation, which is subsequently decoded by the decoder layers 220 to produce the desired output.

In an embodiment, encoder-decoder transformer model 200 includes an input processor 212 for tokenization of an input sequence (herein also referred to as input data or input text) whereby the input text may be split into tokens (words or sub-words) and embedded into a dense vector representation. Tokenization is cutting input data into parts (symbols) that can be mapped (embedded) into a vector space. In some embodiments, special tokens may be added to mark the beginning and end of a sequence. In an embodiment, the input processor 212 may include a tokenizer with a large dataset of tokens, including all the words, punctuation signs, etc. The tokenization step takes every word, prefix, suffix, and punctuation sign, and sends them to a known token from the library.

Embedding layer 214 converts discrete tokens (such as words, sub words, or characters) into continuous vector representations, (herein also referred to as embeddings), In some embodiment, embedding layer 214 may use pre-trained word embeddings (e.g., Word2Vec, GloVe) or sub-word embeddings (e.g., Byte Pair Encoding or WordPiece), however, advantageously, embedding layer 214 may also handle various levels of granularity for tokens, including words, sub words, or even characters. Accordingly, embedding layer 214 may receive input as a sequence of tokens. Each token may be represented as an integer or a one-hot encoded vector, indicating its position in a predefined vocabulary. Embedding layer 214 may map each discrete token to a continuous vector in a high-dimensional space. These continuous vector embeddings may capture the semantic meaning and context of the tokens. For instance, tokens with similar meanings should have embeddings that are close in vector space. Embeddings may be learnable parameters of a model whereby, during training, the model may learn to adjust embeddings to minimize a loss function by making them informative about the input data. This means that the embeddings may be updated via backpropagation during the training process. It should be noted that embeddings, from embedding layer 214, are high-dimensional vectors, often with hundreds of dimensions. This high dimensionality enables the model to capture fine-grained relationships and nuances between tokens in the input data. It also allows the model to learn complex patterns and hierarchies within the data. In some embodiments, the same embeddings may be shared between input and output layers to reduce the parameter count of the model and enhance efficiency. Accordingly, sharing embeddings may help maintain consistency between input and output representations.

Positional encoding 216 may provide information about the order of words whereby positional encoding is added to the word embeddings to provide information about the token's position in a sequence to provide a model with information about the position of each token in the input sequence for capturing sequential dependencies in data comprised within the input sequence. Accordingly, the model may process all tokens in the input sequence in parallel. In a preferred embodiment, positional encoding 216 may treat each token independently and inject information about the position of each token. In some embodiments, positional encoding 216 may learn encoding during training and such encoding may be added to the token embeddings in a way that it varies across dimensions and positions. In some embodiments, positional encoding 216 may use sinusoidal encoding by using a combination of sine and cosine functions with different frequencies and phases to ensure that a positional encoding is unique for each position while capturing a relative position of tokens effectively. According to the embodiment, using sinusoidal functions, positional encoding 216 may introduce a sense of periodicity to the embeddings, allowing the model to distinguish tokens at different positions. A choice of frequencies may ensure that tokens with different positions have distinct positional encodings. This may help the model learn dependencies that are based on the order of tokens. Further according to the embodiment, during each forward pass of the model, positional encoding 216 may modify each token's embedding based on its position in the sequence, making it unique and informative with respect to its position. Positional encoding 216 may function in conjunction with self-attention mechanisms within the architecture to attend to different parts of the input sequence based on the content of the tokens and the positional information. This allows the model to give appropriate attention to contextually relevant tokens. Advantageously, positional encoding 216 provides a learnable component whereby during training, the model learns appropriate encoding patterns that may best capture the sequential dependencies in the training data. This means that the model can adapt to sequences of different lengths and patterns. Positional encoding 216 may provide the model with the necessary information to understand the order and relationships between tokens in the input sequence for processing natural language tasks and other sequence-based tasks in deep learning. Input processor 212 works with token embeddings and positional encodings (from positional encoding 216) combined with parallel processing and self-attention mechanisms for efficient and effective machine translation, text generation, sentiment analysis, and the like.

In an embodiment, encoder layers 218 comprises a feed-forward component and an attention component. In an embodiment, the first layer includes attention 223 and feed-forward 224. The second layer includes attention 225 and feed-forward 226.

Attention components may be used for deciding which parts of the input sequence are important for each token/sub-token, especially when decoding long sequences since the encoder is limited to encoding a fixed-size vector. Attention mechanisms gather information about the relevant context of a given token/sub-token and then encode that context into a vector that represents the token/sub-token. It is used to identify the relationships between tokens in the long sequence while ignoring other sub-tokens that do not have much bearing on a given prediction.

In an embodiment, feed-forward is a feed-forward neural network. After the self-attention mechanism, the encoded representations pass through a feed-forward neural network (FFNN) in each layer. This FFNN consists of two linear transformations separated by a non-linear activation function, such as the Rectified Linear Unit (ReLU). The FFNN helps capture complex patterns and relationships in the encoded representations, enabling the model to learn higher-level features.

In an embodiment, the attention component utilized in encoder layers 218 may be a self-attention mechanism that allows a token to weigh the importance of every other token in the sequence when encoding information. However, a single self-attention mechanism may not be sufficient to capture various types of dependencies within the data, therefore, a multi-head self-attention mechanism addresses this limitation. Accordingly, the multi-head self-attention mechanism applies the self-attention operation multiple times in parallel, with each head (that is, a separate and parallel processing pathway that independently attends to different aspects or patterns within the input sequence) having its own set of learnable parameters (for example, for query, key, and value projections). Each head can focus on different aspects of the input, enabling the model to capture diverse patterns and relationships.

Each encoder layer comprises a feed-forward component whereby after attention, the information passes through a neural network that may perform a transformation to introduce non-linearity into the model as modeled data relationships disclosed herein are non-linear. This transformation allows the model to learn relevant features or representations of the input data. Further, by iteratively stacking multiple encoder layers, transformer architecture can effectively capture complex patterns and dependencies in the input sequence, leading to state-of-the-art performance in various natural language processing tasks such as machine translation, text generation, and sentiment analysis.

Output layer 228 comprises a liner layer and a SoftMax layer. The linear layer is a fully connected neural network that projects the raw scores output by the last layer of the neural network into a logit vector. The SoftMax layer applies the SoftMax function to the logits vector to compute a vector that represents the probability distribution of a list of potential outcomes. In some embodiments, attention scores may be calculated and scaled and then passed through a SoftMax function to obtain the attention weights. These weights may determine how much each token may contribute to the output of the self-attention operation. Tokens that are more relevant to the current token may receive higher attention weights.

In an embodiment, each layer comprises a feed-forward component and an attention component. In an embodiment, the first layer includes attention 229 and feed-forward 230. The second layer includes attention 231 and feed-forward 232. The third layer includes attention 233 and feed-forward 234.

In an embodiment, the attention component of decoder layers 220 includes a masked self-attention component. The masked self-attention component allows the neural network to identify certain features or inputs. The inputs to the decoder block are added with the positional encoding 216. Decoder layers may be configured to predict each token/sub-token in the target language one-by-one at each time step conditioned on all previously generated target tokens/sub-tokens. The masked self-attention component in each layer masks the output embeddings from future time steps. The feed-forward neural network processes each output embedding separately.

Output layer 235 includes a linear layer and a SoftMax layer. Decoder layers 220 may be capped off with a linear layer that acts as a classifier, and a SoftMax to get the word probabilities Linear layer projects the vector produced by the stack of decoders into a logits vector, and the SoftMax layer then turns the scores of the logits vector into probabilities for each token in the vocabulary which are positive and normalized.

The transformer architectures described above can be used as a model for performing NLP-related functions. A trained transformer architecture is referred to as a Large Language Model (LLM). LLM may be a foundation model that utilizes deep learning in NLP and natural language generation (NLG) tasks. To help them predict the complexity and linkages of language, language models are pre-trained on a vast amount of data. LLM may be trained using a large dataset of text paired with appropriate labels (e.g., responses in a conversational dataset). Training involves minimizing a loss function (e.g., cross-entropy) between the predicted output and the actual target sequence. Accordingly, the model learns patterns and relationships within the data to enable the model to make accurate predictions, and classifications, or generate desired outputs when presented with new, unseen data. Training begins with the collection of a dataset that consists of input data (features) and corresponding target labels or ground truth values. The dataset may be representative of the problem the methods disclosed herein is intended to solve. The large language model or language model structure, architecture, and parameters may be defined to include neural networks, decision trees, support vector machines, and more, depending on the nature of the task. Training may include the use of a loss function, also known as a cost or objective function, which is chosen to measure the difference between the model's predictions and the true labels in the training data. The goal is to minimize this loss, as it quantifies the model's performance. Training may utilize an optimization algorithm to adjust the model's parameters (e.g., weights and biases) during training in a way that minimizes the loss. Optimization algorithms may include stochastic gradient descent (SGD), Adam, and RMSprop. During training, data may be fed through the model in a forward pass to make predictions, a loss is then calculated, and gradients of the loss with respect to the model parameters may be computed in a backward pass. Parameters may be updated using the gradients and the chosen optimization algorithm. The learning rate, which determines the step size of parameter updates, may be adjusted. Training may be performed iteratively for multiple epochs (complete passes through the training data) in order to improve the model's performance with each epoch, gradually reducing the loss. During training, a separate validation dataset may be used to monitor the model's performance on data it hasn't seen before. This helps detect overfitting and guides hyperparameter tuning. After training is complete, the model is evaluated on a test dataset that it has never seen. This provides a final assessment of the model's generalization performance. Based on NLP related task, a transformed model architecture is selected.

In some embodiments, an encoder-decoder neural transformer model 200 is used which includes encoder layers 218 and decoder layers 220. Encoder layers 218 process the input data and transform it into a different representation, which is subsequently decoded by the decoder layers 220 to produce the desired output. The output of the top encoder layer 222 is a set of attention vectors K and V which is used by the multi-head attention system of the decoder layers 220. An LLM with an encoder-decoder architecture is used for tasks where an input sequence needs to be transformed into an output sequence, such as machine translation or summarization. The encoder processes the input sequence and compresses the information into a "context vector," and the decoder then uses this context vector to generate the output sequence.

In an LLM with an encoder layers 218, attention is trained on a large unsupervised training dataset of source code and natural language source code summaries. The encoder layers 218 may be then fine-tuned by a fine-tuning component with a particular supervised training dataset for a particular downstream task to produce a corresponding model.

An LLM with only encoder layers 218 is suited for classification tasks due to the type of attention used in the encoder. Encoder layers 218 architecture is often employed in tasks like text classification, sentiment analysis, embedding generation, text generation, language understanding, document classification, and question answering. BERT™ (Bidirectional Encoder Representations from Transformers) is a widely used Encoder-only model. It has been pre-trained on a large corpus of text and can be fine-tuned for specific NLP tasks.

An LLM with only decoder layers 220 is an auto-regressive model that produces an output one element at a time based on the outputs of previous time steps. Code completion is best suited for a decoder layers 220 since it is an auto-regressive task that predicts an ordered sequence of tokens where the order depends on the preceding tokens in the sequence. Decoder layers 220 uses a masked self-head attention which is best suited for auto-regressive tasks since it is explicitly trained to generate auto-regressively. This type of neural transformer model is best suited for text generation, summarization, text completion, language modeling, text correction, and dialogue systems.

Generating text that is both coherent and contextually consistent is a significant challenge in many NLP tasks, such as text generation, machine translation, and content summarization. Decoder-only transformer architectures have been designed to address this problem. GPT (Generative Pre-trained Transformer) models such as GPT-2 and GPT-3 utilize a Decoder-only structure to generate coherent and contextually relevant text.

In decoder layers 220, the multi-head self-attention mechanism in the decoder layers is similar to the one in the encoder layers, but it is masked to prevent the model from attending to future positions, ensuring that the predictions for position "i" can depend only on the known outputs at positions less than "I." This masking happening internally in the decoder's multi-head self-attention mechanism) is essential to maintain the autoregressive property of the transformer model during training and inference. The autoregressive property ensures that the model generates output tokens one at a time and uses previously generated tokens as context for generating the next word token. Decoder-only layers 220 may often employed for text generation, and larger ones display strong zero-shot inference abilities, performing well across a range of tasks. Zero-shot learning (ZSL) is a machine learning scenario in which an AI model is trained to recognize and categorize objects or concepts without having seen any examples of those categories or concepts beforehand. They can perform tasks with limited or no task-specific training data by leveraging the knowledge acquired during pre-training. This is particularly useful in scenarios where labeled data is scarce or when adapting. Further, decoder-based models, particularly those with a large number of layers and attention heads, can capture long-range dependencies in the generated text. They can maintain coherence and consistency over longer sequences, which is important for tasks that require generating longer passages of text. Notable examples of decoder-based autoregressive models are GPT (Generative Pre-trained Transformer), Megatron-LM Transformer-XL, CTRL (Conditional Transformer Language Model).

The transformer neural network described in FIG. 2 may be used by several Language models as discussed above. However, there is uncertainty about the truthfulness, reliability, and credibility of information provided by LLMs. LLMs fail to capture subtleties in language related to certainty, doubt, perspective, and epistemic certainty.

The inventor has conceived, and reduced to practice, a transformer with augmented embedding, and a superior token processing system leading to improved credibility in generated output and efficient processing.

Conceptual Architecture

Figure 3:
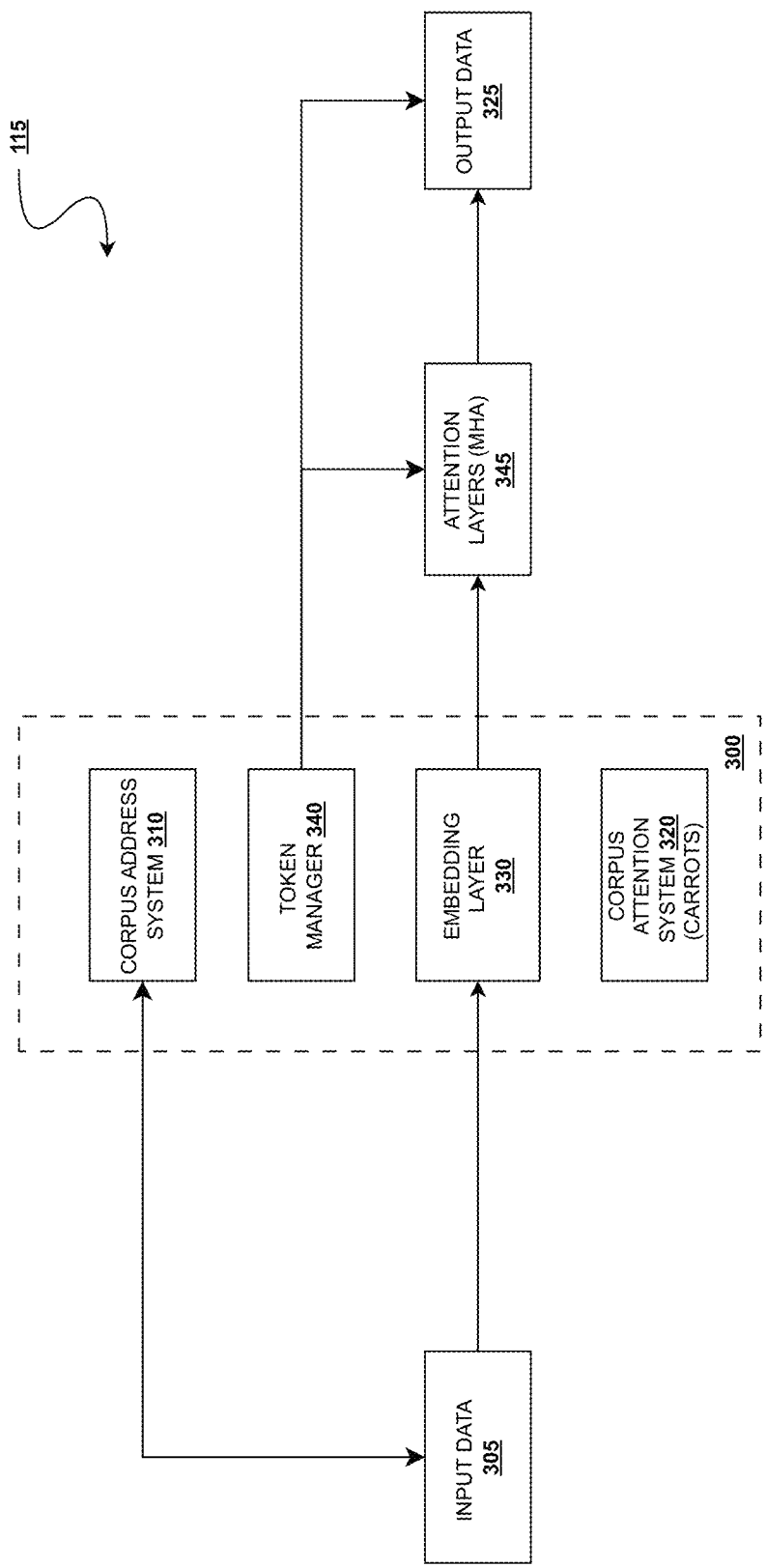
FIG. 3 is a block diagram of an LLM 115 with modifications in the embedding layer and processing by multiple layers of attention, in accordance with an embodiment of the invention.

Referring now to FIG. 3, a block diagram of LLM 115 with modifications to the embedding layer and processing of tokens by multiple layers of attention is disclosed. Input text received from device 100 is processed by LLM 115 using modifications 300 to the transformer neural network described in FIG. 2.

In an embodiment, a corpus address system 310 (also referred to as corpus address reference system) is used for address referencing of input data (corpus) received at LLM 115. The primary purpose of the corpus address referencing system 310 is to provide a detailed, hierarchical addressing scheme for each word or piece of information within the corpus (the entire body of text or input data 305). Further, the corpus address referencing helps keep track of where information comes from and how it relates to other pieces of information.

In an embodiment, in addition to adding a corpus address reference, text annotations may be added to input data 305 to distinguish between voices in dialogue. LLMs 115 that generate or analyze text, and annotations assist LLM 115 in maintaining speaker consistency and contact through interactions. Text annotations may be used for forming speaker tag embeddings. Besides text annotations, text samples in the corpus may be labeled with metadata. (Example: Fiction/non-fiction, author, Dewey Decimal Classification, a broad categorization of the topic).

Further, in some embodiments, corpus reference address system 310 adds key values to the embedding, including a volume (for large corpora that might be divided into multiple volumes), chapter (Indicating the specific chapter within a volume), paragraph (Pinpointing the exact paragraph where the information is found), sentence (specifying the sentence within the paragraph), word (Identifying the specific word within the sentence), attribution of the speaker (noting who said or wrote the information), and document metadata (This could include the document title, publication date, author, etc.) The system may use a dot notation numerical addressing system, similar to IP addresses, allowing for a nested, hierarchical representation. It can extend from the most circumspect aspect (like broad subject areas) down to sub-symbolic representations (like specific word vectors).

It supports the expression of the information with the accompanying state of the consuming network. It incorporates a "theory of mind" component, allowing the system to track not just its knowledge, but also its understanding of what others might know. Example: A simplified address might look like this: 5.3.2.10.4.7 Where: 5=Subject category 3=Volume 2=Chapter 10=Paragraph 4=Sentence 7=Word. This address would uniquely identify a specific word in the corpus, along with its full context. In an embodiment, corpus reference address system 310 works with the input processing of LLM 115.

In natural language processing (NLP), embeddings are a representation of a word. The embedding is used in text analysis. Word embeddings are a machine learning technique that takes a corpus as input and outputs a high-dimensional vector space model of the corpus. A vector is an object that contains components (typically numbers) that represent data within a set space (for example, x, and y coordinates on a two-dimensional plot). Typically, the representation is a real-valued vector that encodes the meaning of the word in such a way that words that are closer in the vector space are expected to be similar in meaning.

In LLM 115, in addition to word embeddings, epistemic embeddings, and speaker perspective are added. Epistemic embedding refers to the incorporation of user sentiment (certainty, doubt, and perspective), attribution and epistemic evidence (level of truthfulness). The augmentation of additional embedding makes LLM 115 generate nuanced, context-aware, and epistemically grounded output. Embedding layer 330 generates a sequence of vectors with epistemic embedding, metadata embedding, and speaker perspective (sentences).

In an embodiment, a corpus attention system 320 uses attention markers (hereinafter referred to as "carrots") 320 for managing focus in the corpus and directing LLMs 115 attention to specific parts of the input or corpus. A "carrot" is an indicator or marker in the input layer that signifies external attention. The purpose of a carrot is to identify specific points in the corpus that should be attended to and facilitate navigation through the corpus during processing. In an embodiment, there may be two main carrots: one for the intake attentional head and one for the write attentional head. The carrots allow the system to jump to different parts of the corpus efficiently. These carrots can be positioned at different points in the corpus. The carrots can be incremented or decremented, allowing them to move through the corpus. This movement is controlled by a corpus attention system 320. The intake carrot determines where the system reads from in the corpus. The write carrot determines where the places words are in the output. This type of non-linear processing of information using a corpus attention system 320 allows LLMs to concentrate on relevant parts of the corpus regardless of their sequential order.

In an embodiment, a token manager 340 is used for managing tokens from the embedding layer 330. Token manager 340 manages the flow of tokens through LLM 115 and includes a bypass circuit gate 342. Token received from the embedding layer 330 may include attention heads and corpus address information. The use of bypass circuit gate 342 allows direct transfer of words from input to output, bypassing full processing when appropriate. Tokens may skip full transformer processing (MHA 345) and go directly to output layer 440 when appropriate.

When attention heads are receiving tokens, the token manager 340 sends the attention heads to Multi-Headed Attention System 345. If there are no attention heads received, the tokens are directly sent to the output layer for reconstruction.

During operation, the input data 305 is processed by corpus addressing system 310, additional epistemic embeddings, sentiment embeddings, and speaker perspective are added to embedding layer 330. The additional embeddings added to token vectors are marked using corpus attention system 320. Once the corpus attention is marked and embedding is ready, token manager 340 determines which tokens require to be processed by Multi-Headed Attention system 345 and which token can be bypassed directly to the output. An output layer (not shown) generates output 325 by reconstruction of the tokens from the embedding layer 330 and/or Multi-Headed Attention system 345. Further, the output processing mechanism may add attributional metadata. Spaces may be added for reconstructing vector values at the output of the attention layers.

DETAILED DESCRIPTION OF EXEMPLARY EMBODIMENTS

Figure 4A:
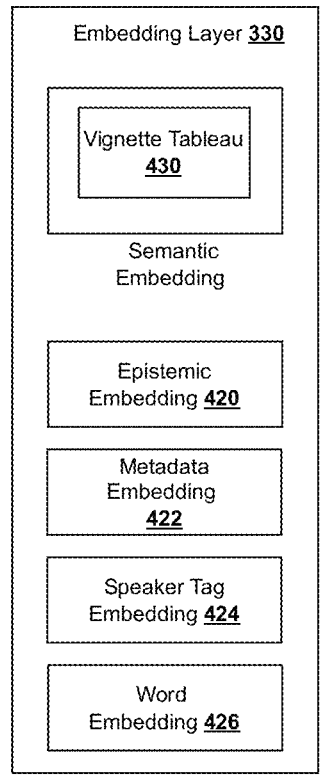
FIG. 4A is a block diagram illustrating an enhanced embedding layer, in accordance with an embodiment of the invention.

FIG. 4A is a block diagram illustrating an enhanced embedding layer 330, in accordance with an embodiment of the invention. Embedding layer 330 combines different types of embeddings including but not limited to word embedding 426, epistemic embedding 420, metadata embedding 422, and speaker tag embedding 424.

In an embodiment, word embedding 426 learns semantically rich vector representations of words and is widely used to initialize NLP. The model integrates attention mechanisms with a Semantic Distance Representation employed by the embodiment, allowing for nuanced semantic understanding. A limitation of CBOW is that it equally weights the context words when making a prediction, which is inefficient since some words have higher predictive values than others. To remove the inefficiency, the Attention Word Embedding (AWE) model, integrates the attention mechanism into the CBOW model.

In an embodiment, metadata embedding 422 refers to metadata labels added to the text samples during input processing. Examples of metadata embedding 422 include categorizing tokens as fiction/non-fiction, author, Dewey Decimal Classification, or a broad categorization of the topic.

In an embodiment, speak tag embeddings 424 may be generated from text annotations added to input data 305 to distinguish between voices in dialogue. Text annotations may be used for forming speaker tag embeddings 424. Speaker tags are primarily relevant in contexts with direct speech or quoted text.

Epistemic embedding 420 refers to the incorporation of user sentiment (certainty, doubt, and perspective), attribution, and epistemic evidence (EE) (level of truthfulness). For dimensions of sentiment, otherness, and epistemic evidence the states that represent any word are converted using the embedding into values decided by an auto-labeling system.

In an embodiment, LLM 115 may use the auto-labeling system to generate values for different dimensions including user sentiment, EE and otherness. Auto-labeling system may generate states for sentiment, epistemic evidence values for reliability of information and attribution value for known/ unknown user.

Auto labeling and training to represent an approximation of evidence for the truth of an assertion or expression. Add a node to the output layer of an ANN and train it to have large positive values when the evidence of the truth of an expression is recent and exogenously sourced. Otherwise, make it a large negative and use such a signifier to denote the requirement to find facts to fit the example if possible.

Building a model of value or desirability based on an energy propagation process to automatically label specific terms used in a Large Language Model or associated embedding. This uses both syntax and semantic proximity to propagate a small number of labels to a large number of terms and contexts. Humans label the word "good" as being good, or desirable and "bad" as being bad or undesirable, and "neutral" as being neither of the prior.

Using explicitly trained estimators for individual valuation or desirability to predict and navigate through contentious topics for which the case for the desirability of a piece of information may be ambiguous or undesirable to a human participant. Additionally using a prediction of mental maturity with respect to such a conversation to gracefully deliver undesirable news.

Sentiment may be propagated from a few labeled states (good=1.0, bad=−1.0, and neutral 0.0,) through the rest of the language by a combination of co-occurrence and semantic proximity. (Range: −1.0 to 1.0).

Attribution is a concept that relates to the source or origin of information, ideas, or statements. Attribution, as part of the epistemic embedding, influences the overall processing, including veracity assessment and contextual understanding. It may encompass not just who said something (which would be covered by speaker tag), but also the reliability and context of the source. For example, self-attribution=−1.0, unknown attribution=0.0, first known other=1.0, second other=2.0, etc. to n positive integers. A list of all these others with indices equaling their otherness as a cardinal number in the positive range can be kept in a JSON format (range: −1.0 to N).

Not entirely unrelated is the quality of epistemic evidence (EE). Because we do not know if we will be able to conquer the mountain of confabulation, lies, and hallucinations, we can start by discrediting everything contended by the agent itself. For each token, an EE score is calculated based on the source and reliability of the information: for example, EE=− 1.0 for information generated by the AI itself, EE=0.0 for information of unknown origin, and −EE=1.0 for information with proper attribution suitable for citation.

Even though "otherness" and EE seem equal at first, they will diverge. For instance, if a word or sentence has direct synonym/s in the embedding space something that the agent said can 'earn' the epistemic valuation of the original writer. So, a strong paraphrase or a direct quotation takes on the characteristic of the original citation.

To manage complex epistemic embeddings, vignettes are formed to handle different aspects of language. The epistemic embedding generated by the auto-labeling system may be processed through a vignette tableau 430. Each vignette may specialize in different aspects of epistemic information (e.g., scientific facts, personal opinions, reported speech, and the like) and may adjust the embedding accordingly. Epistemic information generated by auto-labeling systems that may be refined and adjusted by using an annealing process for word and sentence embedding (referring to FIG. 6B.)

The vignettes collectively form a "tableau" 430 or arrangement that represents the overall semantic space. This component adds epistemic (epi) values to the sentence embeddings, enhancing the representation with additional layers of meaning. Vignettes are formed by identifying clusters or regions in this embedding space that represent coherent semantic concepts or domains. Each vignette is essentially a stack of transformers. Each vignette has defined boundaries within the embedding space. Each vignette has defined boundaries within the embedding space. These boundaries are used to estimate values for the bidding process on option selection. More details related to the bidding process and selection of bids are described in conjunction with FIG. 6A. As the system processes more data, vignettes can become specialized in particular domains. They may develop expertise in specific topics, jargon, or types of language constructs.

Figure 4B:
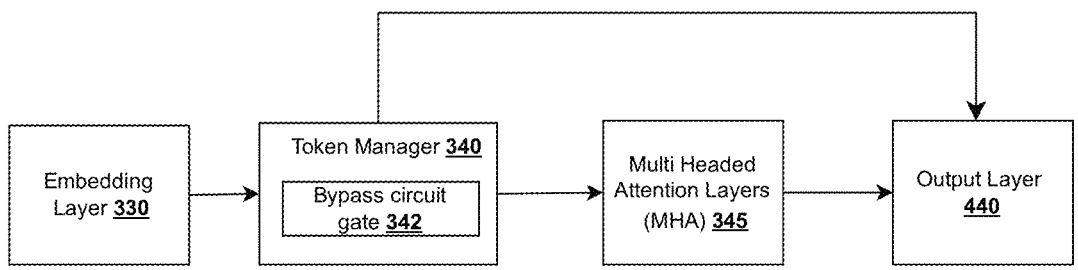
FIG. 4B is a block diagram illustrating the flow of tokens through the LLM, in accordance with an embodiment of the invention.

FIG. 4B is a block diagram illustrating the flow of tokens through LLM 115, in accordance with an embodiment of the invention. Tokens with augmented embedding data generated by embedding layer 330 are received by a token manager 340. Token manager 340 manages the flow of tokens through LLM 115 and includes a bypass route and holder. Token received from the embedding layer 330 may include attention heads and corpus address information. Attention mechanisms are deep learning techniques used to provide an additional focus on a specific component. In deep learning, attention relates to focusing on something and noting its specific importance. When attention heads are receiving tokens, the token manager 340 sends the attention heads to Multi-Headed Attention System 345. If there are no attention heads received, the tokens are directly sent to the output layer for reconstruction.

For each "attention head," there will be three additional lines in the output of the transformer. The first if >0.0 put the present word into the holder for the head replacing whatever value may be there presently. The second value is the "channel selector". If the second >0.0 the head takes the presently held word and sends it through a bypass network that sends the whole token to the output layer with only the modification present at the output layer of the conventional transformer stack, else it puts the present word into the input for a transformer. The third is the "trigger mechanism" which if high: >0.0 then the head sends its payload (holder) to either the bypass conduit or the input of the transformer network.

Figure 5:
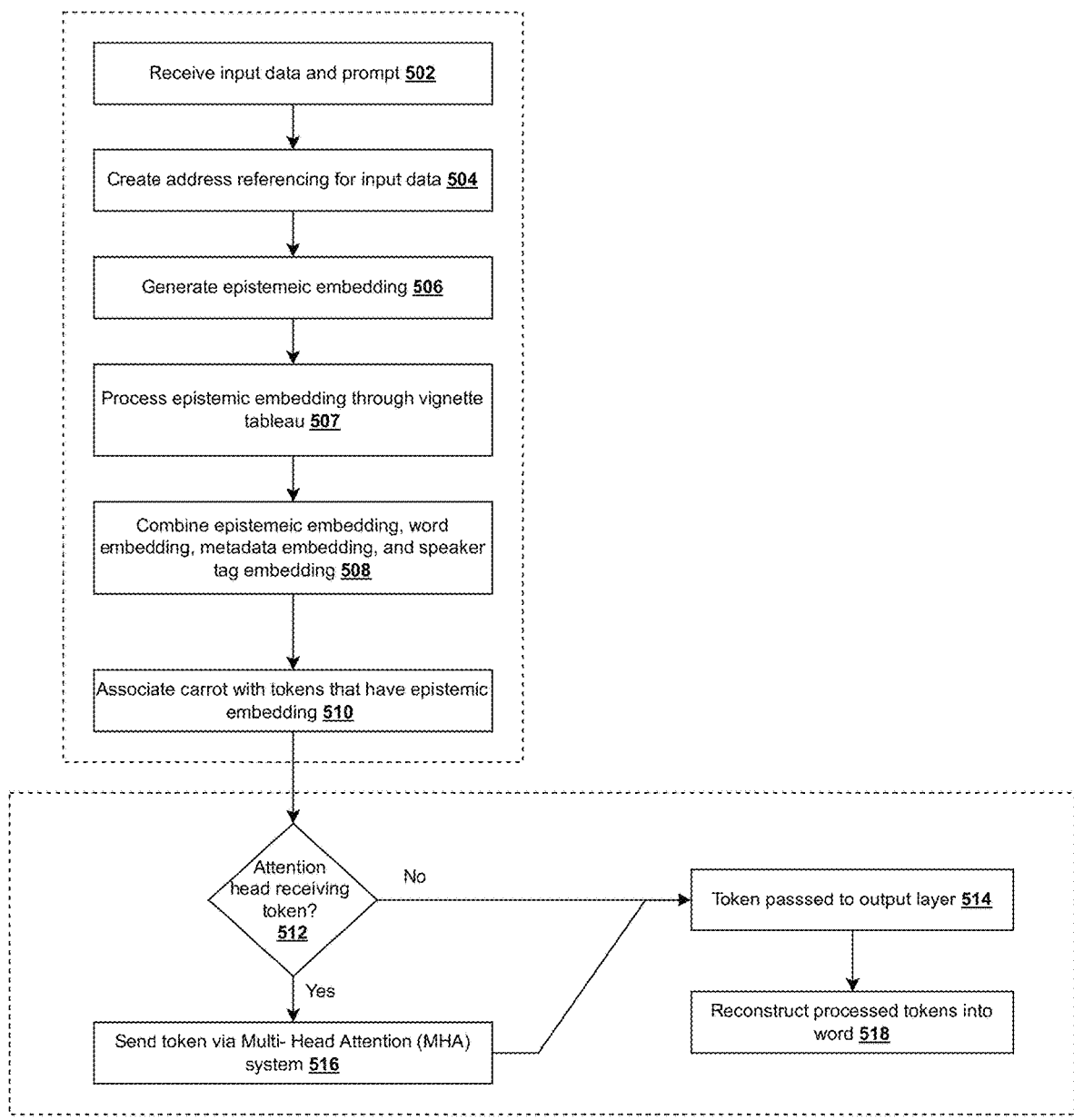
FIG. 5 is a flow diagram illustrating a method for processing input data by LLM, in accordance with an embodiment of the invention.

FIG. 5 is a flow diagram illustrating method for processing input data by LLM 115, in accordance with an embodiment of the invention. Steps in method may be performed by LLM 115 using an advanced transformer model with epistemic embedding. Steps 502 to 510 are performed by LLM 115 to generate and add vectors capturing the attributive dimension, veracity dimension, and sentiment dimension of the word and/or sentence embeddings. Steps 512 to 510 are performed by LLM 115 to manage the flow of tokens via Multi-Headed Attention of LLM 115. At step 502, LLM 115 receives input data 305 and prompts. Input data may be conversations, data collected from responses, and any other text that requires classification, answering questions, document summarization, and text generation problems. LLM 115 is provided with a prompt requesting an NLP-related task. Prompts are generated to be specific and explicit: Prompts provide specific, explicit instructions about what LLM is expected to do. The prompts clearly define the type of output required. Prompts may be generated in a way that is easily interpretable by LLM, leading to more accurate and consistent output. Further, in some cases, prompts may include metadata context, domain-specific context, and semantic context.

At step 504, corpus address system 310 in LLM 115 creates detailed addressing for words and sentences within a larger corpus. It can be considered as an extended addressing system that includes detailed contextual information. The primary purpose of the corpus address referencing system 310 is to provide a detailed, hierarchical addressing scheme for each word or piece of information within the corpus (the entire body of text or input data 305). It provides rich contextual information for each word or piece of data. Corpus address system 310 helps the veracity of output produced by tracking the source and reliability of information. Further, it allows LLM 115 to understand the structure of the information, from broad topics down to specific details, and enables more precise and contextually relevant information retrieval.

At step 506, epistemic embedding vectors are generated. These epistemic embeddings incorporate user sentiment (certainty, doubt, and perspective), attribution, and epistemic evidence (EE) (level of truthfulness) values for each token.

In an embodiment, LLM 115 generates an "Epistemic Evidence" (EE) score to represent truthfulness: EE=−1.0 for information generated by the AI itself (least trustworthy), EE=0.0 for information of unknown origin, EE=1.0 for information with proper attribution suitable for citation (most trustworthy). Veracity is closely tied to the reliability of the information source and EE values.

In an embodiment, LLM 115 may generate sentiment vectors. Each token may be classified into positive, negative, and neutral segments, and scores from −1.0 to 1.0 (for negative to positive) may be allocated. Sentiment scores are appended to each token's embeddings, which can influence the model's interpretation of the narrative mood or character emotions. Sentiment-related embedding vectors enhance the ability of LLM 115 to understand and generate text that is sentiment-aware. This makes LLM 115 suitable for different types of NLP tags including sentiment analysis, personalized dialog generation, or any other application where the emotional state of the text is relevant.

In an embodiment, LLM 115 may generate attribution vectors. Attribution vectors encompass not just who said something (which would be covered by speaker tag), but also the reliability and context of the source. It is represented by otherness dimension may be a concept of attribution. (self-attribution=−1.0, unknown attribution=0.0, first known other=1.0, second other=2.0, etc. to n positive integers.

At step 507, LLM 115 may process the generated epistemic vectors via vignette tableau 430. The epistemic embedding generated by the auto-labeling system is processed through a vignette tableau 430. Each vignette may specialize in different aspects of epistemic information (e.g., scientific facts, personal opinions, reported speech) and may adjust the embedding accordingly. Epistemic information generated by auto-labeling system is refined and adjusted by using a process called turing of vignettes for word and sentence embedding.

The resulting epistemic embedding is a rich representation that captures not just the semantic meaning of a token, but also its sentiment, reliability, and attributional context. This allows LLM 115 to process language with a nuanced understanding of the epistemic properties of the information it's handling.

For example, consider the sentence: 'Scientists believe that climate change is accelerating.'. The epistemic embedding for 'climate change' might include: a high EE score (close to 1.0) due to scientific attribution, a neutral sentiment score (close to 0.0), otherness value >0 (attributed to scientists, not the AI or user), and a slightly reduced certainty due to the word 'believe'. This rich embedding allows LLM 115 to understand and generate language that accurately reflects the level of certainty, sentiment, and attribution associated with different pieces of information."

At step 508, embedding layer 330 may be configured to combine epistemic embedding, word embedding, metadata embedding, and speaker tag embedding. Additional vectors generated for sentiment (sentiment vectors), veracity (EE values), and speaker tags, may be combined with traditional word embeddings. In an embodiment, embedding layer 330 may add at least three embedding vectors to: For each token a multi-dimensional vector is created, combining: original word embedding (e.g., 300 dimensions), sentiment score (e.g., 1 dimension), EE score (e.g., 1 dimension) and otherness value (e.g., 1 dimension)

Words and sentences are converted into vector representations that include additional epistemic information. Each word is represented as a vector in a high-dimensional space. A vector equivalent value reference system may be used to assign vectors to each word, capturing various epistemic and semantic properties. The augmented vectors allow the model to capture nuanced meanings, understand relationships between concepts, and generate more contextually appropriate and semantically rich responses. When combined with the corpus address reference system 310 it provides a powerful framework for representing and processing linguistic information, contributing significantly to the model's ability to improve veracity and overall performance.

At step 510, LLM 115 is configured to associate carrots with tokens that have epistemic embeddings. LLM 115 uses attention markers (hereinafter referred to as "carrots") 320 for managing focus in the corpus and directing the attention of LLM 115 to specific parts of the input or corpus. A "carrot" is an indicator or marker in the input layer that signifies external attention. The purpose of a carrot is to identify specific points in the corpus that should be attended to and facilitate navigation through the corpus during processing. In an embodiment, carrot positions may be integrated into the embedding system, providing contextual information about where attention is focused.

In an embodiment, there may be two external carrots: one for the intake attentional head and one for the write attentional head. The carrots allow the system to jump to different parts of the corpus efficiently. These carrots can be positioned at different points in the corpus. The carrots can be incremented or decremented, allowing them to move through the corpus. This movement is controlled by a corpus attention system 320. The intake carrot determines where the system reads from in the corpus. The write carrot determines where the places words are in the output. This type of non-linear processing of information using a corpus attention system 320 allows LLM 115 to concentrate on relevant parts of the corpus regardless of their sequential order. The movement and positioning of carrots are likely controlled by learned parameters in LLM 115, allowing it to dynamically focus on relevant information.

The word and sentence embeddings are processed by token manager 340 to generate the output 325 for LLM 115. Token manager 340 is used for determining the processing of tokens received from the embedding layer 330. Token manager 340 manages the flow of tokens through LLM 115 and includes a bypass route and holder. Token received from the embedding layer 330 may include attention heads and corpus address information.

During operation, the input data 305 is processed by corpus addressing system 310, additional epistemic embeddings, sentiment embeddings, and speaker perspective are added to embedding layer 330. The additional embeddings added to token vectors are marked using corpus attention system 320.

At step 512, once the corpus attention is marked and embedding is ready, token manager 340 may determine which tokens require to be processed by Multi-Headed Attention System 345 and which token can be bypassed directly to output layer 440.

At step 514, when there are no attention heads receiving tokens, the tokens are directly sent to output layer 440 for reconstruction.

At step 516, when attention heads are receiving tokens, the token manager 340 sends the attention heads to Multi-Headed Attention System 345. The enriched epistemic embeddings pass through the novel attention mechanisms, leveraging the additional context and sentiment information, and contributing to sub-quadratic attention and improved model compression. Accordingly, in allowing the transformer to preprocess attentional signals and avoid unnecessary computation both dynamically and in training, the framework described herein advantageously presents an improvement to the computational efficiency of multi-headed attention thereby considerably expanding opportunity and access to high performance computing. When we combine these attention alterations with enriched epistemic embeddings, we get a powerful system for representing and processing language with awareness of knowledge, belief, and certainty.

At step 518, output layer 440 generates output 325 by reconstruction of the tokens from the embedding layer 330 and/or Multi-Headed Attention System 345. Tokens arrive at the output layer 440 either directly from the embedding layer (via a bypass token pipeline) or after going through MHA System 345. Tokens are converted back to word-based on tokens arriving at output layer 440 and carrot associated with tokens. The intake attention head and write attention head assist the output layer 440 to read from the corpus and determine the where to place the word in the output.

Further, output layer 440 may use meta-data associated with each token and add attributional information and other contextual details to create the output 325. Invisible characters (like spaces or line breaks) are processed and directed by punctuation rules. For reconstructing vector values at the output of the attention layers.

Further, any final adjustments to ensure linguistic correctness, style consistency, or task-specific formatting are applied here. Output 325 may be a direct continuation of the narrative, a summary, or an analytical response depending on the task.

In a preferred embodiment, the reconstruction process is designed to produce output that is not only linguistically correct and contextually appropriate but also retains the nuanced epistemic and attributional information processed by the system. It balances the direct throughput of simple tokens with the complex processing results of the transformer stack, aiming to generate output that reflects both the content and the meta-level information about certainty, source, and relevance.

The method described in FIG. 5 may be used by LLM 115 to perform different NLP tasks. Some examples of NLP tasks and generated outputs are discussed below.

Figure 6A:
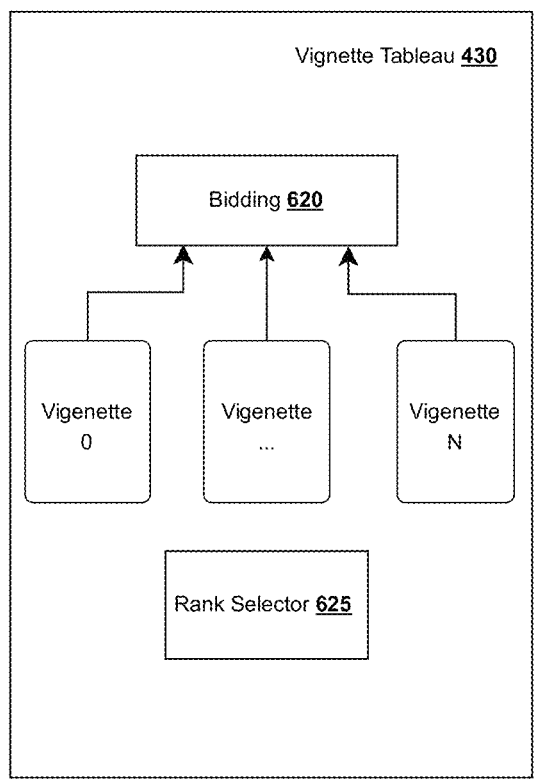
FIG. 6A is an example block diagram of Vignette tableau, in accordance with an embodiment of the invention.

FIG. 6A is an example block diagram of vignette tableau 430, in accordance with an embodiment of the invention. To incorporate epistemic embedding we have opted to inscribe subdomains called "Vignettes Tableau" 430 which are a set of linear boundaries in the embedding space that help score the relationships between traversals of epistemic space. Vignettes Tableau 430 manages how different vignettes compete or collaborate to contribute to the output. Vignettes Tableau 430 is an arrangement that represents the overall semantic space. This tableau structure allows for efficient navigation and processing of complex linguistic information.

In an embodiment, semantic trajectories are primarily proposed by vignettes, which are specialized subdomains of the embedding space. Each trajectory is a path from a starting point to an endpoint in the high-dimensional semantic embedding space.

Each vignette (0 . . . N) has its distinct encoder-decoder pairs of transformers and their interconnectivity cost (in terms of expressed and operative weight parameters) is vastly reduced by subdivision of the embedding. To arbitrate the actions of the various vignettes they each supply a rank selector 625 with a bid in the form of a proposed semantic traversal (Option) for an entire expression (a sentence composed of words).

Bidding 620 is a process to interact with the vignettes and select semantic trajectories. Each vignette proposes a semantic trajectory as part of its "bid". The trajectory is based on the vignette's understanding of the semantic relationships within its domain. The value of a bid for a semantic trajectory is derived from the distance between the vignette's boundaries and the endpoint of the selected option. Each vignette is responsible for maintaining its boundaries and for submitting a bid option to the selector ranking mechanism at each turn.

In a preferred embodiment, rank selector 625 chooses the next option (trajectory) based on a pre-configured or dynamically created ranked choice voting preference schedule (for example, Plackett-Loose Model, Bradley-Terry Model, Cambridge Sampler Model, Alternating Crossover, and the like). For example, in an embodiment, larger bids (covering greater semantic distances) may be more likely to win but may also be riskier. The success or failure of a chosen trajectory influences future bidding. Mistakes may result in tighter bounds and lower confidence for the responsible vignette, affecting its future bids.

Figure 6B:
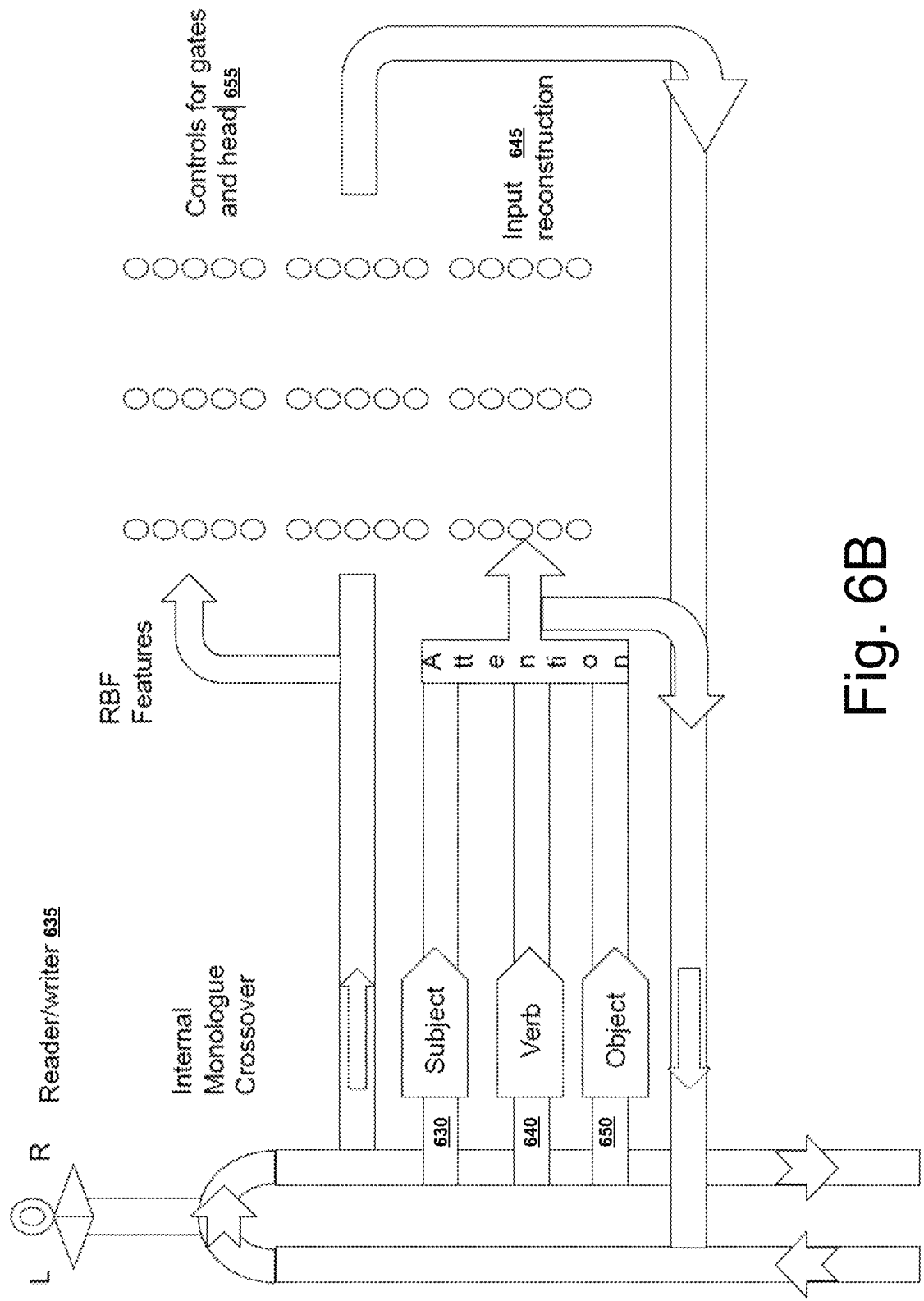
FIG. 6B is an exemplary embodiment of an intercommunication architecture within vignettes, in accordance with an embodiment of the invention.

FIG. 6B is a representation of the autonomous turing of vignettes with a Subject-Verb-Object structure, in accordance with an embodiment of the invention. Each vignette operates independently within Tableau 430, making decisions about language processing and generation. These vignettes are designed to process and generate language in a way that mimics human-like understanding and production. A 'Turing-like' process as referred to herein refers to the autonomous adjustment and traversal of the vignette's state within the semantic space, akin to how a Turing machine manipulates symbols on its tape. For example, in an embodiment, the SVO structure, or, in other embodiments, other adjustments made to traditional scaled-dot product, allows for a nuanced representation of veracity and sentiment at each component level. For example, a vignette might express high certainty about a subject, moderate certainty about an action, and low certainty about an object.

The alternative attention mechanisms and vignette tableau architecture provide a framework for working with epistemically embedded language in a structured and potentially more human-like manner. The epistemic embeddings are an input to this process, enriched and utilized by the vignettes and their augmented transformer architecture(s) to produce more nuanced, aligned, and contextually accurate language processing and generation. Accordingly, in reducing the number of matrix multiplication operations made by a transformer while processing results, the framework described herein advantageously presents an improvement to the computational efficiency of multi-headed attention thereby considerably expanding opportunity and access to high performance computing. When we combine these alterations with epistemic embeddings, we get a powerful system for representing and processing language with awareness of knowledge, belief, and certainty.

In a preferred embodiment, alterations made to traditional attention mechanisms consider semantic and linguistic relevance across varying scopes of information. In an embodiment, subject component 630 in sentence embedding includes standard semantic information about the subject. Subject data can be used to extract epistemic information like the system's certainty about the subject's identity or properties. It may include the "otherness" dimension, indicating if the subject is the system itself, the user, or a third party. A verb component in the sentence embedding may be used to capture context associated with an action (for example, not just an action but where it may have happened and to whom it may have happened). It includes epistemic information about the certainty or factuality of the action. Verb component 640 may further incorporate tense and aspect information, with associated certainty levels. Object data 650 includes relational information associated with the subject and verb. The SVO structure allows for complex epistemic relationships to be represented. For example, "I (certain) think (less certain) that she (third party) knows (high certainty) the answer (unknown certainty)."

A reader/writer 635 enables the vignette to both interpret input (read) and generate output (write) and interfaces with LLMs 115 input and output processes. Reader/writer 635 mechanism interprets and generates language with an awareness of epistemic states.

An input reconstruction 645 recreates and/or reinterprets inputs, possibly for verification or deeper understanding. Further, input reconstruction 645 involves re-evaluating the epistemic content of the input. Control lines for gates and head 655 regulate information flow within the vignette and may control how information is processed through the SVO structure.

These vignettes work within the tableau of vignettes 430, each potentially specializing in different types of language processing or epistemic scenarios. They participate in the bidding process, proposing language structures or interpretations based on their specialized processing. The autonomous nature allows for parallel processing of different aspects of language or different epistemic perspectives. Turing-like aspect ensures that the language processing mimics human-like understanding, potentially leading to more natural and contextually appropriate outputs.

Autonomous turing vignettes with SVO structure and epistemic embeddings would allow the system to process and generate language with a deep understanding of not just what is being said, but how certain or reliable that information is, who it's attributed to, and how it relates to the system's and user's knowledge states. This could lead to more nuanced, context-aware, and epistemically grounded language processing and generation.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

The skilled person will be aware of a range of possible modifications of the various embodiments described above. Accordingly, the present invention is defined by the claims and their equivalents.

What is claimed is:

1. A system for performing Natural Language Processing (NLP) task, the system comprising:
    a computer, comprising a processor, a memory, and a plurality of programming instructions, the plurality of programming instructions when executed by the processor cause the processor to:
    send an input corpus and a prompt with NLP task to an Large Language Model (LLM), wherein the LLM comprises:
    an input layer configured to create detailed addressing for words and sentences within the input corpus;
    an embedding layer configured to:
    generate epistemic embedding for the input corpus using a vignette tableau, wherein vignettes in the vignette tableau determine and manage the epistemic embedding, wherein
    epistemic embeddings are indicative of user sentiment and epistemic evidence values;
    combine the epistemic embedding, word embedding, metadata embedding, and speaker tag embedding to generate tokens with multiple vectors;
    identify carrot positions in the input corpus for tokens with multiple vectors;
    an output layer configured to:
    receive tokens processed from a Multi-Headed Attention (MHA) System; and
    receive tokens directly from the embedding layer; and
    generate an output by reconstructing the input using tokens from the MHA and the embedding layer, wherein the output is presented on a graphical user interface;
    wherein the carrot positions are indicators or markers in the input layer that signify external attention.

2. The system of claim 1, wherein a corpus address system provides a hierarchical addressing scheme for each piece of information within the input corpus.

3. The system of claim 1, further comprising a token manager, wherein the token manager includes a bypass route and holder for managing token flow.

4. The system of claim 1, wherein the vignette tableau comprises multiple vignettes, each representing a subdomain in embedding space.

5. The system of claim 4, further comprising a bidding process for selecting semantic trajectories proposed by vignettes.

* * * * *